(12) United States Patent
Blake et al.

(10) Patent No.: US 9,212,750 B2
(45) Date of Patent: Dec. 15, 2015

(54) SELECTIVE OPERATION VALVE FOR A RECIPIENT FOR BIOPHARMACEUTICAL USE

(75) Inventors: Florian Blake, Hyeres (FR); Jeremy Gibelin, Le Beausset (FR)

(73) Assignee: SARTORIUS STEDIM FMT SAS, Aubagne (FR)

( * ) Notice: Subject to any disclaimer, the term of this patent is extended or adjusted under 35 U.S.C. 154(b) by 26 days.

(21) Appl. No.: 14/131,982

(22) PCT Filed: Jul. 12, 2012

(86) PCT No.: PCT/FR2012/051663
§ 371 (c)(1),
(2), (4) Date: Jan. 10, 2014

(87) PCT Pub. No.: WO2013/011232
PCT Pub. Date: Jan. 24, 2013

(65) Prior Publication Data
US 2014/0131399 A1 May 15, 2014

(30) Foreign Application Priority Data

Jul. 19, 2011 (FR) ...................................... 11 56541

(51) Int. Cl.
*F16K 3/26* (2006.01)
*B65D 47/00* (2006.01)
*B65D 47/26* (2006.01)

(52) U.S. Cl.
CPC ................ *F16K 3/262* (2013.01); *B65D 47/00* (2013.01); *B65D 47/261* (2013.01); *F16K 3/265* (2013.01); *Y10T 137/87877* (2015.04)

(58) Field of Classification Search
CPC ........... F16K 3/262; F16K 2/265; F16K 3/24; F16K 3/343; F16K 3/346; F16K 3/26; F16K 3/267; B65D 47/261; B65D 47/00; B65D 25/00; A61J 1/2093; A61J 2001/2037; A61J 2001/2068; A61J 2001/2051; A61J 1/1475; A61M 39/18; C12M 23/46; Y10T 29/49826

USPC .......... 251/318, 325, 341, 343–344, 349, 353
See application file for complete search history.

(56) References Cited

U.S. PATENT DOCUMENTS 8,544,497 B2 * 10/2013 Hillier et al. .................. 137/542
2005/0016620 A1    1/2005 Proulx et al.

FOREIGN PATENT DOCUMENTS

| DE | 100 00 391 |   | 7/2001 |
| FR | 1532450 | * | 7/1968 |
| WO | 00/04131 |   | 1/2000 |
| WO | 2006/087740 |   | 8/2006 |
| WO | 2007/035592 |   | 3/2007 |

OTHER PUBLICATIONS

International Search Report dated Sep. 27, 2012, corresponding to PCT/FR2012/051663.

* cited by examiner

*Primary Examiner* — Marina Tietjen
(74) *Attorney, Agent, or Firm* — Young & Thompson

(57) ABSTRACT

The valve includes a female part having a closed, transverse, proximal end wall, and a tubular wall integral with a flange part, a lateral opening being formed on the proximal section of the tubular wall, a male part having a tubular wall forming, on the proximal side, a closing/opening part having an open, transverse, proximal end; the closing/opening part has an external shape and an external dimension that fit the internal shape and internal dimension of the proximal receiving part of the female part. The sealing elements include three ring seals separated from one another in an axial direction, supported by the upper surface of the tubular wall of the male part and engaging with the female part, a proximal seal to the fluid product, a distal seal to external contaminants, and an intermediate seal to the fluid product and to external contaminants between the proximal and distal seals.

26 Claims, 2 Drawing Sheets

SELECTIVE OPERATION VALVE FOR A RECIPIENT FOR BIOPHARMACEUTICAL USE

The invention relates to selective operation valves intended for equipping recipients for biopharmaceutical use.

Such a recipient is referred to as "biopharmaceutical" because it is intended to contain a biopharmaceutical product for a biopharmaceutical process. In the context of the patent application, such a biopharmaceutical product is understood to mean a product derived from biotechnology—culture media, cell cultures, buffer solutions, artificial nutrition liquids, etc.—or a pharmaceutical product or more generally a product for use in the medical field. Such a product is liquid, pasty, or powdery, in one or more phases, homogeneous or non-homogeneous, and in any case is able to flow through a valve, which is why the product can be described as a "fluid" in the context of the invention. The invention also applies to any product other than as just defined, but which can be considered analogous in the properties affecting a flow of said product when controlled by a valve which can be in the closed state or open state. The biopharmaceutical process includes filling, mixing, storing, and emptying the biopharmaceutical product in relation with the recipient.

Document WO 2007035592 discloses a selective operation valve intended for equipping a recipient for biopharmaceutical use having a wall comprising an opening for this purpose. This valve has a main axis and comprises:
- a hollow female part, having a lateral flange part adapted for attachment to the recipient wall and a transverse valve opening,
- a hollow male part, mounted to slide axially within the female part along a certain stroke between a closed state and an open state, having a proximal closing/opening part provided with a proximal, lateral valve opening,
- and two sealing O-rings supported by the male part on each side of the lateral valve opening.

This valve is designed to avoid the presence of dead zones, which are volumes of product that cannot be stirred and therefore cannot be mixed. Such dead zones can occur in particular in the lower part of the recipient where the materials contained in the recipient collect due to gravity.

By its design, the valve according to WO 2007035592 can only be used for a draining operation, the male part of the valve then projecting relative to the recipient wall and located within the space inside the recipient.

Document DE 100 00 391 concerns a valve which is generally applicable to a beverage bottle. Under no circumstances is this valve intended for equipping a recipient for biopharmaceutical use. In such applications, there is a very high risk of bacterial contamination and the valve must be designed to prevent this. The valve of DE 100 00 391 has two seals and is therefore unsuitable for the case covered by the invention where there is a risk of bacterial contamination.

Document US 2005/016620 discloses a sterile fluid transfer device comprising a body having a bore formed through at least a portion of its interior, and a movable plunger contained within the bore, the body having a first end and a second end, the first end containing a face designed to be attached to the upstream component, the second end being connected to a downstream component, the first end of the plunger when it is in a closed position being in alignment with the face of body.

Document WO 2006/087740 discloses a cap for bottles having an inner cavity and a tubular wall defining a mouth, said cap comprising an axially fixed portion having: a first wall suitable to be connected to said tubular wall, an inner wall suitable to be arranged within said tubular wall and having at least one radial aperture, a ring suitable to structurally connect said first wall to said inner wall, a transversal bottom wall connected to said inner wall, and a movable spout which can assume a first closed position and a second open position, said spout having a wall and an outlet.

There exists a need for a selective operation valve intended for equipping a biopharmaceutical recipient, which can function both for draining and for filling and which has no movable part projecting from the recipient wall and located inside the cavity of the recipient itself and which has no or very few dead zones during processing of the fluid product. There is also a need for such a valve to prevent or limit the adverse effects of contamination from the outside, which allows the valve to operate in multiple back and forth sequences. There is also a need for the seals not to be unduly stressed by the concentration of significant forces at the acute portions of the valve and to prevent or at least minimize the risk of the seals being cut or damaged.

The invention aims to provide a solution to these problems while proposing a valve that is simple and economical to manufacture and assemble.

For this purpose, a first object of the invention relates to a selective operation valve, intended for equipping a recipient for biopharmaceutical use having a wall comprising an opening for this purpose, of the type having a main axis and comprising:
- a hollow female part, having a lateral flange part adapted for attachment to the recipient wall and a first valve opening,
- a hollow male part, mounted to slide axially within the female part in a stroke C between a closed state and an open state, having a proximal closing/opening part provided with a second valve opening, proximal, capable of selectively preventing or allowing the passage of fluid product when respectively in the closed state and in the open state, a distal portion provided with a distal opening, and a passageway adapted for the passage of fluid product, arranged in the proximal portion and the distal portion between the second valve opening and the distal opening,
- sealing means.

This valve is such that:
- the female part comprises a closed, transverse, proximal end wall, and a tubular wall extending axially and integral with the flange part, said tubular wall having a proximal section between the end wall and the flange part, extending axially for a length at least equal to the stroke C, and a distal section closed on the side opposite the proximal section relative to the flange part, the first opening being a lateral valve opening arranged in said proximal section,
- the male part comprises a tubular wall extending axially, forming, on the proximal side, the closing/opening part whose open proximal transverse end constitutes the second opening, and forming, on the distal side, the distal portion,
- the closing/opening part has an external shape and an external dimension that fit the internal shape and internal dimension of the proximal receiving part of the female part delimited by its end wall and its proximal section of tubular wall,
- the sealing means comprise three ring seals spaced apart from each other in the axial direction, supported by the outer surface of the tubular wall of the male part and cooperating with the female part, a proximal seal to the fluid product, associated with the closing/opening part, a distal seal to contaminants of external origin, the furthest from the proximal seal, and an intermediate seal to the fluid product and to contaminants of external origin, between the proximal seal and the distal seal.

In the closed state, the closing/opening part is located within the receiving part, the male part covering the lateral valve opening.

In the open state, the closing/opening part is located outside the receiving part, the lateral valve opening and the transverse valve opening being unobstructed and allowing the passage of fluid product.

In one embodiment, the lateral valve opening is adjacent to the flange part, on the proximal side.

In the closed state, the proximal seal to the fluid product cooperates with the inside surface of the portion of the tubular wall of the female part by contact with it, so as to prevent the passage of fluid product to or from the recipient through the transverse valve opening.

In both the closed state and the open state, the distal seal to contaminants of external origin cooperates with the inside surface of the distal portion of the tubular wall of the female part by continual contact with it, so as to prevent or limit the passage of contaminants of external origin into the recipient as the male part slides axially back and forth.

In both the closed state and the open state, the intermediate seal to the fluid product and to contaminants of external origin cooperates with the inside surface of the distal portion of the tubular wall of the female part by continual contact with it, so as to prevent the passage of fluid product.

The distance in the axial direction between the intermediate seal and the distal seal is at least equal, in particular is slightly greater than the stroke C.

In one embodiment, the male part has a slightly smaller transverse diameter in the closing/opening part, so that the proximal seal to the fluid product is without substantial frictional contact with, and more particularly is slightly apart from the inside surface of, the distal portion of the tubular wall of the female part when in the open state. In addition, the proximal seal has a slightly smaller outside diameter than the outside diameter of the intermediate seal and distal seal.

In one embodiment, the area connecting the inside surface of the proximal portion of the tubular wall of the female part and the lateral valve opening area is chamfered to eliminate any sharp corners.

In one embodiment, the male part protrudes from the female part on the distal side, in both the closed state and the open state. In particular, the distal end portion of the distal portion of the male part forms or supports or cooperates with a connection means.

In one embodiment, the male part and the female part are kinematically coupled to each other by a helical-type means, such that a relative axial pivoting imparted to the male part causes it to slide axially, in particular a means comprising a lateral pin on a part engaging with a helical groove in the other part.

The valve is a supply valve and/or a drain valve, depending on the case.

The invention relates to the valve in its closed state, where the closing/opening part is located within the receiving part and the male part is covering the lateral valve opening. It also relates to the valve in its open state, where the closing/opening part is located outside the receiving part and the lateral valve opening and transverse valve opening are unobstructed and able to allow the passage of fluid product.

The invention also relates to a multiple valve arrangement, comprising a plurality of valves as previously described, the plurality of female parts and the same plurality of male parts being arranged beside one another, the flange part being common to the plurality of female parts.

Another object of the invention relates to a recipient for biopharmaceutical use in which the wall comprises an opening for mounting a valve as described above, the flange part being secured in a fixed and fluid-tight manner to the recipient wall around the opening, the proximal portion of the female part being located within the inside space delimited by the recipient wall, and the distal portion of the female part being located outside said inside space.

In one embodiment, the valve is located in the portion of the recipient wall intended to be a lower portion, the valve being a supply and/or drain valve. In another embodiment, the valve is located in the portion of the recipient wall intended to be an upper portion or to be near the upper portion, the valve being a supply valve.

In one embodiment, the recipient for biopharmaceutical use is equipped with a functional means for carrying out a function for a biopharmaceutical process performed using the recipient, located at least partly within the inside space of the recipient. In particular, said functional means is located at least partly near the valve, and in particular is partly associated structurally with it. Depending on the case, the functional means is a mixing means or an aerator or some other means for carrying out a function for a biopharmaceutical process.

A particular embodiment of the invention is now described with reference to the drawings, in which.

Figure 1:
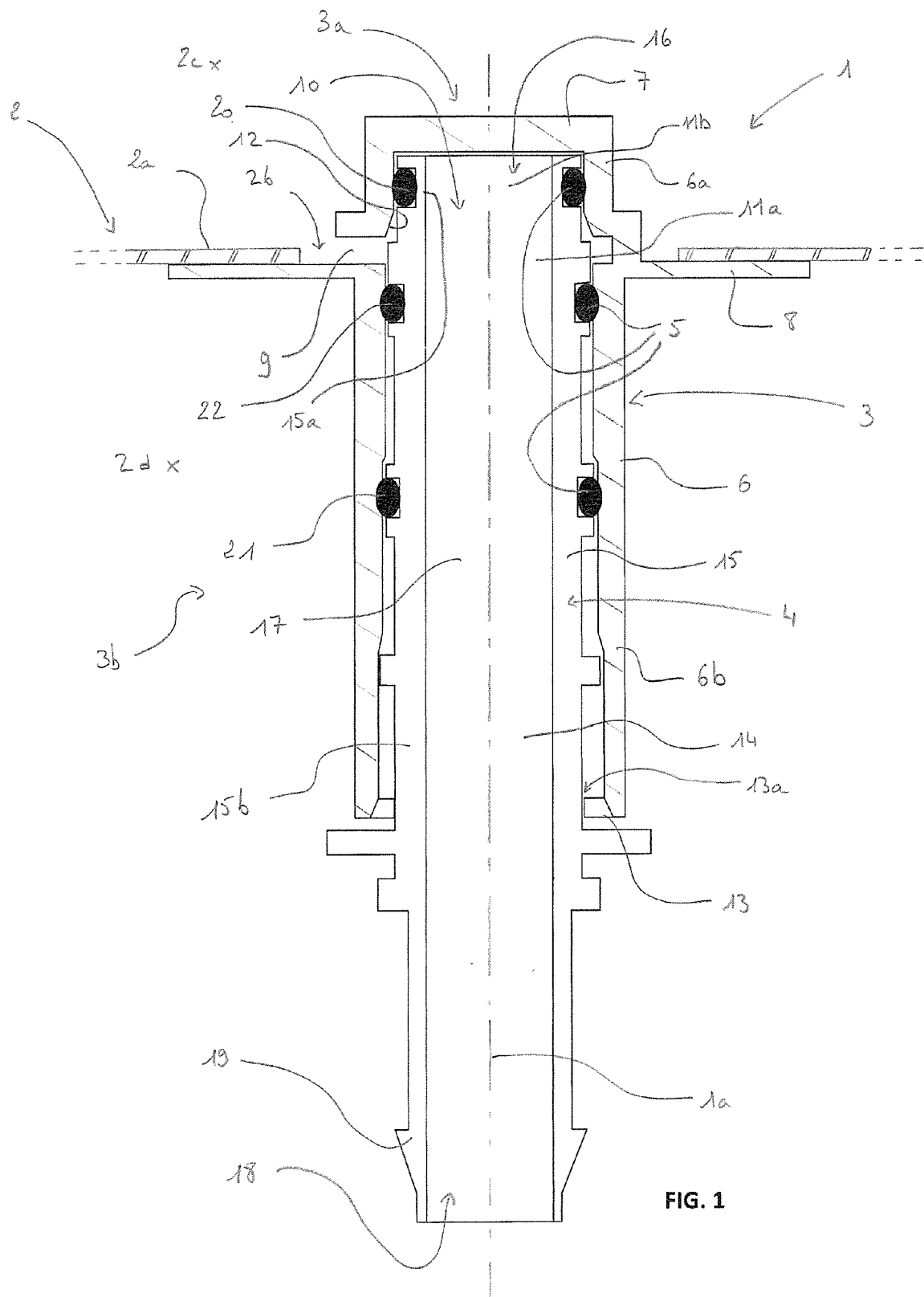
FIG. 1 is an axial cross-sectional view illustrating a valve according to the invention and a portion of the adjoining recipient wall, in the closed state.

A valve 1 of the invention is selectively operable and is specifically intended for equipping a biopharmaceutical recipient 2 as defined above, having a wall 2a comprising an opening 2b for this purpose.

The wall 2a defines an inside space 2c, inside the recipient 2, as opposed to the outside space 2d.

Depending on the embodiments, the recipient 2 is rigid and reusable, or is flexible and disposable such as a 2D or 3D bag of the type described in document WO 00/04131.

The recipient 2 is intended to contain a biopharmaceutical product in one or more phases, homogeneous or non-homogeneous, fluid, meaning it can flow through a valve, for a biopharmaceutical process including filling, mixing, storing, and draining the biopharmaceutical product in relation with the recipient 2.

If necessary, the recipient 2 is equipped with a means for mixing the fluid product, located at least partly within the inside space 2c. Depending on the embodiments, such a mixing means may be entirely or partially located near the valve 2, and in particular may be partly associated structurally with it, for example supported by it. In other embodiments, the recipient 2 is equipped with a functional means other than a mixing means, such as an aerator or some other means for performing a function for a biopharmaceutical process.

In one embodiment, the valve 1 is located in the portion of the wall 2a of the recipient 2 intended to be a lower portion, the valve 1 being a supply and/or drain valve. In another embodiment, the valve 1 is located in the portion of the wall 2a of the recipient 2 intended to be an upper portion or to be near the upper portion, the valve 1 being a supply valve.

The valve 1 comprises a female part 3 and a male part 4, both of them rigid, hollow, and generally cylindrical with a circular base. It also comprises sealing means 5. The female 3 and male 4 parts are associated with each other, with interposed sealing means 5, the female part 3 being external and the male part being internal, relative to a transverse plane of the valve 1. The assembly of parts, and each of the parts, has an axis 1a perpendicular or substantially perpendicular to the wall 2a in the region of the opening 2b of the recipient 2.

In relative terms, the term "proximal" conventionally refers to what is close, or closer, to the recipient 2, while conversely the term "distal" refers to what is away from, or further away from, the recipient 2. These terms are used to identify the component parts of the valve 1 and their positions relative to each other and relative to the recipient 2, and to identify movements along the axis 1a. It is understood, however, that the valve 1 can be considered by itself, independently of the recipient 2, before it is mounted thereon.

Figure 2:
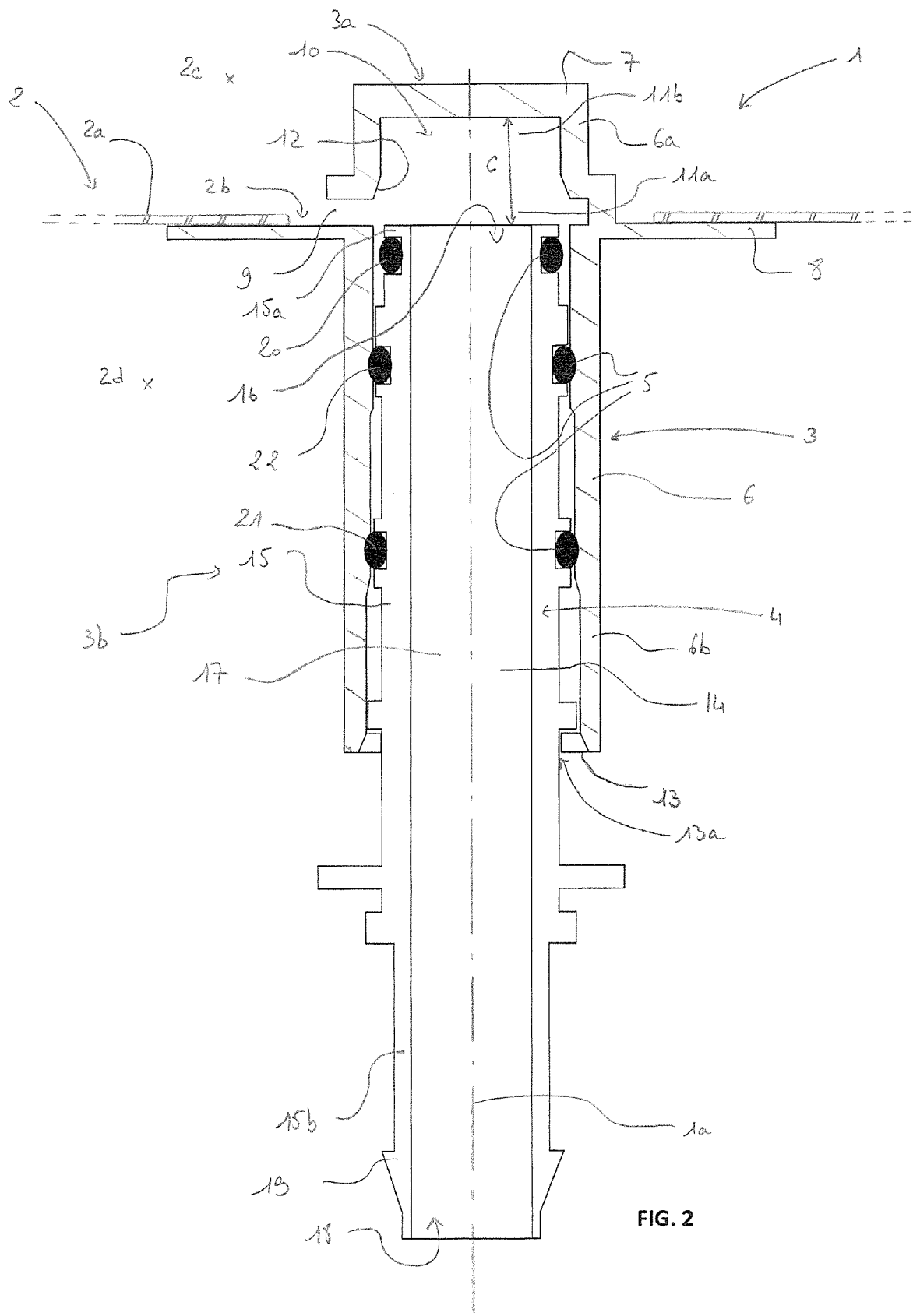
FIG. 2 is an axial cross-sectional view similar to FIG. 1, illustrating the valve in the open state.

The term "closed state" refers to the situation where the valve 1 is closed, meaning a fluid product is prevented from passing through it, as illustrated in FIG. 1, while the term "open state" refers to the reverse situation where the valve 1 is open, meaning a fluid product can pass through it, as illustrated in FIG. 2. Movements along the axis 1a between the closed state and the open state cover an axial slide along the stroke C. More generally, the terms "closed" and "open" respectively refer to a situation where a fluid product is prevented from passing through, and a situation where it is allowed to pass through.

The terms "axial" and "axially" refer to the general direction of the axis 1a, while the terms "transverse" and "transversely" refer to what lies in a plane generally perpendicular to the axis 1a. As to the terms "lateral" or "side", these refer to being located to the side relative to the axis 1a.

The female part 3 comprises a tubular wall 6, extending axially.

The female part 3 comprises, at its proximal end, a closed, transverse, proximal end wall 7, which closes off the tubular wall 6 at that location.

The female part 3 comprises a lateral flange part 8, extending transversely away from the axis 1a, such as a collar in the form of a flat ring.

The tubular wall 6, the end wall 7, and the flange part 8 form one body and are, for example, made of a single piece of plastic.

The recipient 2 with the valve 1 is such that the flange part 8 is secured in a fixed and fluid-tight manner to the wall 2a around the opening 2b, by adhesive bonding, welding, or any other suitable manner.

The flange part 8 delimits, for the tubular wall 6, a proximal section 6a and a distal section 6b, and for the female part 3, a proximal portion 3a and a distal portion 3b.

The proximal section 6a extends axially between the end wall 7 and the flange part 8. It extends for a length at least equal to the stroke C, and more particularly close to the stroke C, as a minimal length is generally desired.

The distal section 6b is closed. It is on the side opposite the proximal section 6a, relative to the flange part 8. It extends for an axial length which, in the embodiment shown, is substantially greater than the axial length of the proximal section 6a and of the stroke C. For example, the distal section extends for a length several times—such as about three to five times—the length of the proximal section 6a, these values being illustrative only. At its distal end 13, the female part 3 and more specifically its distal section 6b comprises a distal transverse opening 13a.

The female part 3 also comprises a lateral valve opening 9 arranged in the proximal section 6b, which forms a first valve opening.

The female part 3 when considered by itself is hollow, providing a space 14 forming a passage and guide, with the lateral valve opening 9 on the proximal side and the distal transverse opening 13a on the distal side.

The internal portion of the female part 3 which is proximal and is delimited by the end wall 7 and the proximal section 6a is referred to as the receiving part 10.

In the embodiment shown, the lateral valve opening 9 is adjacent to the flange part 8 on the proximal side. In the transverse region 11a at the lateral valve opening 9, the tubular wall 6 is of increased diameter 6 compared to the transverse region 11b of the proximal section 6a that is away from the lateral valve opening 9. The inlet in the receiving part 10 in the proximal direction is therefore flared.

Furthermore, the area connecting the inside surface of the proximal section 6a of the tubular wall 6 and the area 11a of the lateral valve opening 9 is chamfered so as to have a lateral and transverse bevel 12, which eliminates any sharp angles inside the female part 3 that could damage a seal in its axial back-and-forth sliding motion.

With the above structural arrangements, the proximal portion 3a of the female part 3 is located within the inside space 2c, and the distal portion 3b of the female part 3 is located outside the inside space 2c, in the outside space 2d.

The male part 4 comprises a tubular wall 15 which extends axially.

The tubular wall 15 is sized relative to the tubular wall 6 so that the male part 4 is mounted to slide axially within the female part 3 in a stroke C between the closed state and the open state.

The tubular wall 15 comprises a proximal closing/opening part 15a having an open transverse proximal end provided with a transverse, proximal valve opening 16 that forms a second valve opening.

The tubular wall 15 forms a distal portion 15b on the distal side.

The male part 4 is selectively able to prevent or allow the passage of fluid product when respectively in the closed state and the open state.

In the embodiment shown, the male part 4 protrudes from the female part 3 on the distal side, in both the closed state and open state, the male part 4 having a greater axial length than the female part 3. For example, the length of the male part 4 can be between one and two times that of the female part 3.

The closing/opening part 15a of the male part 4 has an external shape and external dimension that fit the internal shape and internal dimension of the receiving part 10 of the female part 3.

Moreover, the male part 4 has a slightly smaller transverse outside diameter in the closing/opening part 15a, the inside diameter of the receiving part 10 of the female part 3 being defined accordingly.

The male part 4 when considered by itself is hollow, providing a space 17 forming a passage, with the proximal transverse valve opening 16 at the proximal end, and a distal transverse opening 18 at the distal end.

In the embodiment shown, the distal end portion of the distal portion 15b forms or supports or engages with a connection means 19, such as the means known as a hose barb to a person skilled in the art.

The male part 4 and the female part 3 are structurally associated with each other, the male part 4 being coaxially mounted within the female part 3. The two parts 3 and 4 are kinematically coupled to each other by helical-type means, such that an axial relative pivoting imparted to the male part 4 about the axis 1a causes it to slide axially. In particular, this means is of the type comprising a lateral pin on a part 3, 4 engaging with a helical groove in the other part 4, 3. It is understood that the two parts 3 and 4 can be kinematically coupled in a different manner, as long as the male part 4 can slide axially within the female part 3 along the stroke C.

In addition, it may be arranged so that the portion of the male part 4 which protrudes from the female part 3 may comprise or be associated with drive or displacement means, manual or non-manual.

In the closed state, the closing/opening part 15a is located within the receiving part 10. The male part 4 then closes off the lateral valve opening 9. The fluid product cannot pass through the valve 1.

In the open state, the closing/opening part 15a is located outside the receiving part 10. The lateral valve opening 9 and the transverse valve opening 16 are then unobstructed and can allow the passage of fluid product. The fluid product is able to pass through the valve 1.

The sealing means 5 comprises three ring seals 20, 21 and 22, such as O-rings made of silicone or other equivalent material.

The three seals 20, 21 and 22 are spaced apart from each other in the axial direction. They are supported by the outer surface of the tubular wall 15 of the male part 4. They cooperate with the female part 3.

These three seals are:
a proximal seal 20 to the fluid product, associated with the closing/opening part 15a,
a distal seal 21 to contaminants of external origin (such as bacteria), furthest away from the proximal seal 20, and
an intermediate seal 22 to the fluid product and to contaminants of external origin, between the proximal seal 20 and the distal seal 21.

In the closed state, the proximal seal 20 to the fluid product cooperates with the inside surface of the proximal portion of the tubular wall 6 of the female part 3 by contact with it. The proximal seal 20 thus prevents the passage of fluid product to or from the recipient 2 through the transverse valve opening 16.

In both the closed state and the open state, the distal seal 21 to contaminants of external origin cooperates with the inside surface of the distal portion 3b of the tubular wall 6 of the female part 3 by continual contact with it. The distal seal 21 thus prevents or limits the passage of contaminants of external origin into the recipient 2 as the male part slides axially back and forth.

In both the closed state and the open state, the intermediate seal 22 to the fluid product and to contaminants of external origin cooperates with the inside surface of the distal portion 3b of the tubular wall 6 of the female part 3 by continual contact with it, preventing the passage of fluid product.

The distance in the axial direction between the intermediate seal 22 and the distal seal 21 is at least equal, in particular is slightly greater than the stroke C.

The male part 4 has a slightly smaller transverse outside diameter in the closing/opening part 15a, so that the proximal seal 20 to the fluid product is without substantial frictional contact with, and more particularly is slightly apart from the inside surface of, the distal portion 3b of the tubular wall 6 of the female part when in the open state. The proximal seal 20 to the fluid product therefore has a slightly smaller outside diameter than the outside diameter of the intermediate seal 22 to fluid product and contaminants of external origin and of the distal seal 21 to contaminants of external origin.

The words "without substantial contact" are understood to mean that the proximal seal 20 is not in contact with the inside surface of the distal portion 3b in the open state or is only slightly in contact with this distal portion 3b without sealing off the inside space 2c of the recipient 2. This ensures that the proximal seal 20 is not damaged by the lip of the distal portion 3b when the valve transitions from the closed to the open state, because it does not come in contact with the edge of the distal portion 3b during its movement when the valve transitions from the closed to the open state.

While having the specified dimensional characteristics for their outside diameter, the seals 20, 21 and 22 may have the same radial thickness or may have different radial thicknesses, as well as the same inside diameter or different inside diameters. In one embodiment, seals 21 and 22 are identical, seals 20, 21 and 22 have the same radial thickness, and seal 20 has a slightly smaller inside diameter than the inside diameter of seals 21 and 22. Of course, the male part 4 is shaped accordingly, to allow receiving the seals 20, 21 and 22 with their corresponding inside diameters and radial thicknesses.

With the structural arrangements described, it is possible to activate the valve multiple times in the sequence open state→closed state→open state→closed state while ensuring non-contamination of the biopharmaceutical contents of the recipient 2 by contaminants of external origin (such as microorganisms) as the valve 1 is manipulated.

As indicated, the valve 1 is a drain valve or a supply valve, depending on its placement on the recipient 2 and its use.

An object of the invention is that the valve 1 is in the closed state, with the closing/opening part 15a located within the receiving part 10 and the male part 4 covering the lateral valve opening 9, or that it is in the open state, with the closing/opening part 15a being located outside the receiving part 10 and the lateral valve opening 9 and the transverse valve opening 16 being unobstructed and allowing the passage of fluid product.

In one embodiment, the valve is delivered or is originally in the open state. This structural arrangement enables optimal activation of the valve.

In one arrangement, the valve is not one but multiple valves, comprising a plurality of single valves described above, the plurality of female parts 3 and the same plurality of male parts 4 being arranged beside one another, the flange part 8 being common to the plurality of female parts 3.

The invention claimed is:

1. Selective operation valve (1), for equipping a recipient for biopharmaceutical use having a wall (2a) comprising an opening (2b) for this purpose, where proximal refers to an inside space delimited by the wall of the recipient and distal refers to a space outside the inside space, the selective operation valve comprising:
a main axis (1a),
a hollow female part (3), having a lateral flange part (8) adapted for attachment to the wall (2a) of the recipient (2) and a first valve opening,
a hollow male part (4), mounted to slide axially within the female part (3) in a stroke C between a closed state and an open state, having a proximal closing/opening part provided with a second valve opening, proximal, that selectively prevents or allows the passage of fluid product when respectively in the closed state and in the open state, a distal portion provided with a distal opening, and a passageway adapted for the passage of fluid product, arranged in the proximal portion and the distal portion between the second valve opening and the distal opening, and
sealing means (5),
wherein,
the female part (3) comprises a proximal portion (3a) and a distal portion (3b), a closed, transverse, proximal end wall (7) in the proximal portion, and a tubular wall (6) extending axially in the proximal and distal portions and being integral with the flange part (8), said tubular wall (6) having a proximal section (6a) between the end wall (7) and the flange part (8), extending axially for a length at least equal to the stroke C, and a distal section (6b) closed on the side opposite the proximal section (6a) relative to the flange part (8), the first opening being a lateral valve opening (9) arranged in said proximal section (6a), the male part (4) comprises a tubular wall (15) extending axially, forming, on the proximal side, the closing/opening part (15a) whose open proximal transverse end constitutes the second opening (16), and forming, on the distal side, the distal portion (15b), the closing/opening part (15a) has an external shape and an external dimension that fit the internal shape and internal dimension of a proximal receiving part (10) of the female part (3) delimited by the end wall (7) and the proximal section (6a) of the tubular wall (6), the sealing means (5) comprise three ring seals spaced apart from each other in the axial direction, supported by the outer surface of the tubular wall (15) of the male part (4) and cooperating with the female part (3), a proximal seal (20) to the fluid product, associated with the closing/opening part (15a), a distal seal (21) to contaminants of external original, the furthest from the proximal seal (20), and an intermediate seal (22) to the fluid product and to contaminants of external origin, between the proximal seal (20) and the distal seal (21).

2. Valve (1) according to claim 1, wherein, in the closed state, the closing/opening part (15a) is located within the receiving part (10), the male part (4) covering the lateral valve opening (9), and in the open state, the closing/opening part (15a) is located outside the receiving part (10), the lateral valve opening (9) and the transverse valve opening (16) being unobstructed and allowing the passage of fluid product.

3. Valve (1) according to claim 1, wherein the lateral valve opening (9) is adjacent to the flange part (8), on the proximal side.

4. Valve (1) according to claim 1, wherein, in the closed state, the proximal seal (20) to the fluid product cooperates with the inside surface of the portion of the tubular wall (6) of the female part (3) by contact with it, so as to prevent the passage of fluid product to or from the recipient (2) through the transverse valve opening (16).

5. Valve (1) according to claim 1, wherein, in both the closed state and the open state, the intermediate seal (22) to the fluid product and to contaminants of external origin cooperates with the inside surface of the distal portion of the tubular wall (6) of the female part (3) by continual contact with it, so as to prevent the passage of fluid product.

6. Valve (1) according to claim 1, wherein the distance in the axial direction between the intermediate seal (22) and the distal seal (21) is at least equal to the stroke C.

7. Valve (1) according to claim 6, wherein the distance in the axial direction between the intermediate seal (22) and the distal seal (21) is greater than the stroke C.

8. Valve (1) according to claim 1, wherein the male part (4) has a slightly smaller transverse diameter in the closing/opening part (15a), so that the proximal seal (20) to the fluid product is without substantial frictional contact with, and more particularly is slightly apart from the inside surface of, the distal portion of the tubular wall (6) of the female part (3) when in the open state and does not come in contact with the edge of the distal portion (3b) during its movement when the valve transitions from the closed to the open state.

9. Valve (1) according to claim 1, wherein the proximal seal (20) has a slightly smaller outside diameter than the outside diameter of the intermediate seal (22) and of the distal seal (21).

10. Valve (1) according to claim 1, wherein the area connecting the inside surface of the proximal portion of the tubular wall of the female part (3) and the lateral valve opening (9) area is chamfered (12) to eliminate any sharp corners.

11. Valve (1) according to claim 1, wherein the male part (4) protrudes from the female part (3) on the distal side, in both the closed state and the open state.

12. Valve (1) according to claim 11, wherein the distal end portion of the distal portion of the male part (4) forms or supports or cooperates with a connection means (19).

13. Valve (1) according to claim 1, wherein the male part (4) and the female part (3) are kinematically coupled to each other by a helical-type means.

14. Valve (1) according to claim 13, wherein the helical-type means is a relative axial pivoting imparted to the male part (4) that causes the male part to slide axially.

15. Valve (1) according to claim 13, wherein the helical-type means comprises a lateral pin engaging a helical groove on opposing ones of the male part (4) and the female part (3).

16. Valve (1) according to claim 1, wherein the valve (1) is a supply valve and/or drain valve.

17. Valve (1) according to claim 1, wherein it is in the closed state, the closing/opening part (15a) being located within the receiving part (10) and the male part (4) covering the lateral valve opening (9).

18. Valve (1) according to claim 1, wherein it is in the open state, the closing/opening part (15a) being located outside the receiving part (10) and the lateral valve opening (9) and transverse valve opening (16) being unobstructed and able to allow the passage of fluid product.

19. Multiple valve arrangement, comprising a plurality of valves according to claim 1, the plurality of female parts (3) and the same plurality of male parts (4) being arranged beside one another, the flange part (8) being common to the plurality of female parts (3).

20. Recipient (2) for biopharmaceutical use comprising a wall (2a) with an opening (2b) in which is mounted the valve (1) according to claim 1, the flange part (8) being secured in a fixed and fluid-tight manner to the wall (2a) of the recipient (2) around the opening (2b), the proximal portion (3a) of the female part (3) being located within the inside space (2c) delimited by the wall (2a) of the recipient (2), and the distal portion (3b) of the female part (3) being located outside said inside space (2c).

21. Recipient (2) for biopharmaceutical use according to claim 20, wherein the valve (1) is located in the portion of the recipient wall (2) intended to be a lower portion, the valve (1) then being a supply and/or drain valve.

22. Recipient (2) for biopharmaceutical use according to claim 20, wherein the valve (1) is located in the portion of the recipient wall (2) intended to be an upper portion or to be near the upper portion, the valve (1) then being a supply valve.

23. Recipient (2) for biopharmaceutical use according to claim 20, wherein it is equipped with a functional means for carrying out a function for a biopharmaceutical process performed using the recipient (2), located at least partly within the inside space (2c) of the recipient (2).

24. Recipient (2) for biopharmaceutical use according to claim 23, wherein said functional means is located at least partly near the valve (1), and in particularly is partly associated structurally with it.

25. Recipient (2) for biopharmaceutical use according to claim 23, wherein the functional means is a mixing means or an aerator or some other means for carrying out a function for a biopharmaceutical process.

26. Selective operation valve (1), for equipping a recipient for biopharmaceutical use having a wall (2a) comprising an opening (2b) for this purpose, comprising:
- a main axis (1a),
- a hollow female part (3), having a lateral flange part (8) adapted for attachment to the wall (2a) of the recipient (2) and a first valve opening,
- a hollow male part (4), mounted to slide axially within the female part (3) in a stroke C between a closed state and an open state, having a proximal closing/opening part provided with a second valve opening, proximal, that selectively prevents or allows the passage of fluid product when respectively in the closed state and in the open state, a distal portion provided with a distal opening, and a passageway adapted for the passage of fluid product, arranged in the proximal portion and the distal portion between the second valve opening and the distal opening, and
- sealing means (5), wherein,
- the female part (3) comprises a closed, transverse, proximal end wall (7), and a tubular wall (6) extending axially and being integral with the flange part (8), said tubular wall (6) having a proximal section (6a) between the end wall (7) and the flange part (8), extending axially for a length at least equal to the stroke C, and a distal section (6b) closed on the side opposite the proximal section (6a) relative to the flange part (8), the first opening being a lateral valve opening (9) arranged in said proximal section (6a),
- the male part (4) comprises a tubular wall (15) extending axially, forming, on the proximal side, the closing/opening part (15a) whose open proximal transverse end constitutes the second opening (16), and forming, on the distal side, the distal portion (15b),
- the closing/opening part (15a) has an external shape and an external dimension that fit the internal shape and internal dimension of a proximal receiving part (10) of the female part (3) delimited by the end wall (7) and the proximal section (6a) of the tubular wall (6),
- the sealing means (5) comprise three ring seals spaced apart from each other in the axial direction, supported by the outer surface of the tubular wall (15) of the male part (4) and cooperating with the female part (3), a proximal seal (20) to the fluid product, associated with the closing/opening part (15a), a distal seal (21) to contaminants of external original, the furthest from the proximal seal (20), and an intermediate seal (22) to the fluid product and to contaminants of external origin, between the proximal seal (20) and the distal seal (21),
- wherein, in both the closed state and the open state, the distal seal (21) to contaminants of external origin cooperates with the inside surface of the distal portion of the tubular wall (6) of the female part (3) by continual contact with it, so as to prevent or limit the passage of contaminants of external origin into the recipient (2) as the male part (4) slides axially back and forth.

\* \* \* \* \*